(12) United States Patent
Döttling et al.

(10) Patent No.: US 8,811,887 B2
(45) Date of Patent: Aug. 19, 2014

(54) DATA LOAD REDISTRIBUTION WITHIN A RELAY ENHANCED TELECOMMUNICATION NETWORK

(75) Inventors: Martin Döttling, Neubiberg (DE); Michael Faerber, Wolfratshausen (DE); Jaroslaw Lachowski, Nowy Sacz (PL); Andreas Lobinger, Grafing (DE); Juergen Michel, Munich (DE); Richard Waldhauser, München (DE)

(73) Assignee: Nokia Siemens Networks Oy, Espoo (FI)

( * ) Notice: Subject to any disclaimer, the term of this patent is extended or adjusted under 35 U.S.C. 154(b) by 226 days.

(21) Appl. No.: 13/130,774

(22) PCT Filed: Nov. 26, 2008

(86) PCT No.: PCT/EP2008/066236
§ 371 (c)(1),
(2), (4) Date: May 24, 2011

(87) PCT Pub. No.: WO2010/060473
PCT Pub. Date: Jun. 3, 2010

(65) Prior Publication Data
US 2011/0223854 A1   Sep. 15, 2011

(51) Int. Cl.
*H04B 3/36* (2006.01)
*H04B 7/14* (2006.01)

(52) U.S. Cl.
USPC ............. 455/7; 455/11.1; 455/67.11; 455/88; 455/452.1; 455/453; 370/315; 375/130; 343/793

(58) Field of Classification Search
USPC .......... 455/7, 3.03, 9, 10, 11.1, 15, 67.11, 88, 455/452.1, 452.2, 453, 455, 509, 562.1; 370/310, 315; 375/130, 150; 343/793
See application file for complete search history.

(56) References Cited

U.S. PATENT DOCUMENTS

2007/0129071 A1   6/2007  Shapira

OTHER PUBLICATIONS

Jiang, P., et al., "Self-organizing Relay Stations in Relay Based Cellular Networks", © 2008 Elsevier B.V., pp. 2937-2945, Aug. 15, 2008.

*Primary Examiner* — Shaima Q Aminzay
(74) *Attorney, Agent, or Firm* — Harrington & Smith

(57) ABSTRACT

It is described a method for changing the data load distribution within a telecommunication network including a first base station, a second base station and a relay node being connected to the first base station and/or to the second base station. The described method includes (a) establishing for each of a plurality of user equipments a first indirect connection to the first base station via the relay node, (b) establishing in a collective manner for each of the plurality of user equipments a second indirect connection to the second base station via the relay node, and (c) terminating in a collective manner for each of the plurality of user equipments the first indirect connection. It is further described a network element, which is adapted to carry out the above described data load redistribution method, and a computer program, which is adapted for controlling the above described data load redistribution method.

11 Claims, 1 Drawing Sheet

US 8,811,887 B2

DATA LOAD REDISTRIBUTION WITHIN A RELAY ENHANCED TELECOMMUNICATION NETWORK

FIELD OF INVENTION

The present invention generally relates to the field of mobile wireless telecommunication networks, such as for instance 3GPP Long Term Evolution (LTE) and Advanced LTE (LTE-A) networks. The present invention is further related to a system behavior in mobile telecommunication networks with relay nodes, which may support an automatic network configuration for instance by a so called Self Optimizing Network (SON) procedure, which is of major concern in future mobile wireless telecommunication networks. Specifically, the present invention relates to method for changing the data load distribution within a telecommunication network comprising a first base station, a second base station and a relay node being connected to the first base station and/or to the second base station. Further, the present invention relates to a network element, which is adapted to carry out the above described data load redistribution method. Furthermore, the present invention relates to a computer program, which is adapted for controlling the above described data load redistribution method.

ART BACKGROUND

In wireless communication the operating frequency bands are selected on the demanded and available bandwidths. System concepts like LTE and LTE-A introduce in particular the capability of high data rate wireless communication. To achieve the high data rate and high performance operation, large Bandwidths are needed, e.g. 20 MHz for LTE. For LTE-A an even more concatenation of several bands is considered, which probably requires the operation in even higher frequency bands. All these constraints are finally limiting the achievable range of the cell, thus increasing the number of cells needed.

A cost efficient solution for improving the performance of LTE and LTE-A telecommunication networks can be the utilization of relay nodes (RN), which allows installations without having terrestrial broadband access or the need to install a micro wave link. However the use of a given spectrum in a given cell for multiple uses such as (a) connecting user equipments (UE) via an enhanced NodeB (eNB), (b) connecting UEs via a RN and (c) connecting a RN to the eNB, opens a field for new load balancing solutions.

Therefore, load balancing is an advanced measure in an established mobile telecommunication network in order to use in a beneficial way the in-homogeneities with respect to the data traffic within the telecommunication network. Specifically, load balancing is a measure to offload traffic from on cell to another cell or multiple cells, under the pre-requisite that the other cell(s) have sufficient traffic handling capabilities left.

Load balancing can be done by manipulating the Handover (HO) and cell selection parameters for a user equipment (UE). However, this is often not very reliable because the reception of radio signals can be perceived quite differently and may lead to suboptimal HO decisions. For instance idle mode UEs will still camp on their original cell until physical parameters and broadcast parameters are changed in such a way, that a number of UEs decide to camp on other cells. Further, an alignment between idle mode and active mode parameter settings is useful in order to avoid that for UEs changing from idle to active state a HO would be carried out immediately after the state change.

A more reliable method to steer the load balancing is to force handovers to other cells by signaling commands, which enforce a HO although none of the thresholds usually triggering a HO would be crossed. The advantage is that the allocation of the UE to other cells can be ensured, the disadvantage is that precautions have to be taken to avoid that individual UE executing handovers back to the originating cell prematurely. However, the aspects of data load distribution in a radio resource caused by self backhaul cannot be ignored in current load balancing procedures. The relay node would be considered as defining an independent cell, whereas any offload to this cell would increase the backhaul load and thus would cause an unchanged overload situation in the radio resource load of the cell, which comprises a relationship with the relay node.

There may be a need for providing a method for effectively changing the data load distribution within a relay enhanced telecommunication network.

SUMMARY OF THE INVENTION

This need may be met by the subject matter according to the independent claims. Advantageous embodiments of the present invention are described by the dependent claims.

According to a first aspect of the invention there is provided a method for changing the data load distribution within a telecommunication network comprising a first base station, a second base station and a relay node being connected to the first base station and/or to the second base station. The provided method comprises (a) establishing for each of a plurality of user equipments a first indirect connection to the first base station via the relay node, (b) establishing in a collective manner for each of the plurality of user equipments a second indirect connection to the second base station via the relay node, and (c) terminating in a collective manner for each of the plurality of user equipments the first indirect connection.

This first aspect of the invention is based on the idea that data traffic being loaded on the first base station can be effectively offloaded from the first base station and uploaded to the second base station simply by commonly redirecting the communication path for the plurality of user equipments. Thereby, within the telecommunication network the data traffic can be allocated to the various base stations in an efficient manner. There is no need to individually hand over each of the plurality of user equipments in order to redistribute or to reallocate at least a portion of the overall data traffic from the first base station to the second base station. The described collective data load redistribution can be handled in an efficient manner by the relay node. Thereby, it is in principle not necessary that the user equipments are involved in the collective data load redistribution procedure.

It is mentioned that apart from considering the data load with respect to the different base stations one can also consider the data load on the available air interfaces within a first cell being assigned to the first base station and a second cell being assigned to the second base station. Thereby, the first cell and the second cell refer to spatial regions, in which user equipments are predominately served by the first base station and the second base station, respectively. In this context, if one assumes no movement of the user equipments, the described reallocation does not have any effect on the air interface data load, which is caused by the communication between the user equipments and the relay node. However, by contrast thereto, the air interface data load, which is caused by the backhaul traffic data between the relay node and the corresponding base station, will be strongly affected by the reallocation procedure. As a consequence, by carrying out the described data load redistribution method not only the device-related data load on the base stations but also the overall data load on the air interfaces within the cells of the telecommunication will be redistributed. Thereby, interference effects between different radio links may be reduced significantly.

It is further mentioned that the step of collectively establishing the plurality of second indirect connections may comprise (a) a complete set-up of a new connection respectively a new relationship between the relay node and the second base station or (b) an intensification of the usage of an already existing connection respectively relationship between the relay node and the second base station. Correspondingly, the step of collectively terminating the plurality of first indirect connections may comprise (a) a complete disconnection of an already existing connection respectively relationship between the relay node and the first base station or (b) a mitigation of the usage of a connection respectively a relationship between the relay node and the first base station.

According to an embodiment of the invention the method further comprises detecting an overload situation of the first base station before collectively terminating the plurality of first indirect connections. This may provide the advantage that the described method can be initiated in a reliable manner when an operational state of the telecommunication network and in particular of the first base station is existing, which operational state may be harmful at least for some radio links within the telecommunication network. In other words, by initiating the described data traffic reallocation method only in case of an overload situation of the first base station, unnecessary executions of the described method can be avoided.

The overload situation can be detected by any network element of the telecommunication network. In particular, the overload situation can be detected by the relay node. Alternatively, the relay node can be informed about the overload situation for instance from the first base station by receiving an appropriate message from the first base station.

It has to be mentioned that the execution of the described data load redistribution method may also be aborted for instance when the second base station refuses to take over the additional data load, which would be loaded on the second base station when the described method would be carried out completely and successfully. Specifically, this may be the case when the second base station suffers from an overload situation and is therefore not able to accept a further data load.

According to a further embodiment of the invention the method further comprises detecting an underload situation of the second base station before collectively establishing the plurality of second indirect connection. This may provide the advantage that the described method can be initiated not only in operational states of the telecommunication network and in particular of the first base station, which operational states require a redistribution of the data load in order to avoid a degradation of the performance of the telecommunication network. The described method can merely be initiated already in case of a load imbalance, which is characterized by an underload situation of the second base station. In other words, by initiating the described data traffic reallocation method can be initiated in an anticipating manner such that performance degradation can be avoided effectively.

The underload situation can be detected by any network element of the telecommunication network. In particular, the underload situation can be detected by the relay node. Alternatively, the relay node can be informed about the underload situation for instance from the second base station by means of an appropriate message.

According to a further embodiment of the invention the method further comprises (a) monitoring base stations being located in the network environment of the relay node, (b) determining a ranking of the monitored base stations, wherein the ranking is indicative for the suitability of the respective monitored base station to act as the second base station, and (c) selecting the highest ranking monitored base station as the second base station.

This may mean that in particular during a relay node establishment phase the relay node can monitor all suitable neighbor cell relations and rank them about arbitrary properties, which are indicative for representing a candidate base station for the relay node. Preferably the best suited base station is selected for the relationship between the relay node and the base station. The best suited base station is preferably a base station, which (a) is adapted to and which (b) is in an operational state, in which additional data load can be taken over.

The monitoring of base stations and/or the determination of the ranking may be carried out in particular by the relay node. When in the following a data load redistribution procedure as described above is carried out, the first base station, i.e. the base station having the current relationship with the relay node, may poll the list of suitable neighbor base stations from the relay node. The first base station may than select the second base station as a target base station, which complies with the load balancing requirements. Specifically, if the load of a monitored base station is actually low, this base station is listed in the ranking as to be suitable for taking over additional data traffic.

The first base station may communicate with the target base station and inform the target base station that it represents the second base station for the above described data load distribution method, which will be carried out in a little while. For the communication between the first and the second base station a Core Network such as the Internet may be employed. Thereby, an agreement with respect to a backhaul transport radio resource allocation for the data traffic between the relay node and the respective base station should be achieved between the first and the second base station. Specifically, a message indicating a request for a data load redistribution may be conveyed in particular from the first base station together with a relay node handover execution message to the relay node, which than would change according the handover command the backhaul resource allocation from the first base station to the second base station.

According to a further embodiment of the invention the relay node has a relationship to both the first base station and the second base station. This may hold (a) before collectively establishing the plurality of second indirect connections and/or (b) after collectively terminating the plurality of first indirect connections.

Specifically, the step of collectively establishing the plurality of second indirect connections may comprise an intensification of the usage of an already existing connection respectively relationship between the relay node and the second base station. Correspondingly, the step of collectively terminating the plurality of first indirect connections may comprise a reduction of the usage of a connection respectively of a relationship between the relay node and the first base station.

Descriptive speaking, the described data load distribution method may be carried out in an analog manner. This means that instead of completely setting up a new data connection between the relay node and the second base station and/or instead of completely canceling or closing an existing data connection between the relay node and the first base station when carrying out the described method, the relay related data load of first base station is reduced and the relay related data load of the second base station may be increased.

In a specific implementation the relay node which is getting offloaded may establish two backhaul relationships, a first backhaul relationship to the first base station and a second backhaul relationship to the second base station. Thereby, the data traffic being managed by the air interface of the relay node is split into two streams, which are getting backhauled by at least two backhaul radio links to different base stations.

According to a further embodiment of the invention (a) collectively establishing the plurality of second indirect connections comprises setting up a new data connection between the relay node and the second base station and/or (b) collectively terminating the plurality of first indirect connections comprises closing an existing data connection between the relay node and the first base station.

Descriptive speaking, the described data load redistribution method may be carried out in a digital manner. Thereby, for loading data traffic on the second base station a data connection between the relay node and the second base station is set up for the first time at least for some period of time during which there was no relationship between the relay node and the second base station. Correspondingly, for offloading data traffic from the first base station the relay node is completely disconnected from first base station.

This may mean that a complete relay node together with the relay related data traffic is handed over from the first base station to the second base station. Such a complete relay node handover, wherein all relay related data traffic is automatically handed over from the first to the second base station, is advantageous compared to handing over individual user equipments, because the relay node aggregates data traffic typically from several user equipments. Therefore, with a single handover process a more pronounced offload of data load can be achieved.

In other words, in telecommunication networks comprising base stations and relay nodes in the network layout, groups of user equipments would camp or would be in active mode with a relationship to a certain relay node. Instead of initiating a number of individual handovers within the respective base station and manipulating on the cell selection parameters broadcasted in the cell, an entire relay node may get reallocated to another base station. This is like a handover of the backhaul radio resource trunk of a relay node from the first base station being assigned to a first cell to the second base station being assigned to another cell.

According to a further embodiment of the invention for the plurality of established second indirect connection an adaptive modulation and coding scheme is used. This may provide the advantage that in case a first path loss between the relay node and the second base station is larger than a second path loss between the relay node and the first base station the newly established higher path loss can be compensated at least partially.

It is mentioned that of course the usage of an adaptive modulation and coding (AMC), wherein the modulation is selected depending on the actual quality of the respective radio link, will result in the selection of a more robust modulation and coding scheme. Although if this will require more bandwidth for the backhaul of the relay node, the fact that at least some data load is removed from the first base station may improve the overall data load situation within the telecommunication network even if the total data traffic will be increased due to the selection of the more robust AMC scheme.

According to a further aspect of the invention there is provided a network element for changing the data load distribution within a telecommunication network comprising a first base station, a second base station and a relay node being connected to the first base station and/or to the second base station, wherein for each of a plurality of user equipments a first indirect connection to the first base station via the relay node is established. The provided network element comprises (a) an establishing unit for establishing in a collective manner for each of the plurality of user equipments a second indirect connection to the second base station via the relay node, and (b) a terminating unit for terminating in a collective manner for each of the plurality of user equipments the first indirect connection.

Also this second aspect of the invention is based on the idea that data traffic being loaded on the first base station can be effectively offloaded from the first base station and uploaded to the second base station simply by commonly redirecting the communication path for the plurality of user equipments. Thereby, there is no need to individually hand over each of the plurality of user equipments in order to redistribute or to reallocate at least a portion of the overall data traffic from the first base station to the second base station.

The described collective data load redistribution can be handled in an efficient manner by the network element. Thereby, it is in principle not necessary that the user equipments are involved in the collective data load redistribution procedure.

According to an embodiment of the invention the network element is the first base station and/or the second base station. This means that any embodiment of the above described data load redistribution method may be controlled by the first base station and/or by the second base station.

The first base station may become active in order to initiate the described collective handover of the plurality of first indirect connections in particular if an overload situation of the first base station has been detected. The second base station may become active for initiating the described collective handover of the plurality of first indirect connections in particular if an underload situation of the second base station has been detected.

According to a further embodiment of the invention network element is the relay node. The relay node may control the above described data load redistribution method in particular (a) if the relay node has been informed by the first base station about an overload situation and/or (b) if the relay node has been informed by the second base station about an underload situation.

According to a further embodiment of the invention the network element comprises a beam forming capability. The beam forming capability may be realized in particular by means of directional antennas or by means of antenna arrays.

Since a network element such as a relay node or a base station is typically much more expensive than a user equipment and both a relay node and a base station usually serve a plurality of user equipments, providing a beam forming capability for a base station and/or for a relay node might be in particular efficient in order to enhance the radio quality for a plurality of user equipments.

By providing beam forming capability the network element may more easily connect to different base stations and/or to different relay nodes. Thereby, an enhanced path loss, which might have been observed between the relay node and the second base station, as compared to the path loss between the relay node and the first base station may be compensated by an appropriate antenna beam forming gain.

In this respect it is mentioned that both relay nodes and base stations can easily contribute to such a gain, because beam forming is easier for network elements which do not move within the telecommunication network.

It is further mentioned that for the same mobility reasons Inter Cell Interference Coordination (ISIC) schemes may perform better for stationary network elements than for moving network elements such as user equipments. In this context this means that the backhaul data traffic between the stationary relay node and in particular the stationary second base station may be made more reliable by applying an appropriate ISIC scheme. Since the principles of inter cell interference coordination are generally known in the field of optimizing the data traffic within telecommunication networks, for the sake of conciseness no further details about ISIC are given in this patent application.

According to a further aspect of the invention there is provided a computer program for changing the data load distribution within a telecommunication network comprising a first base station, a second base station and a relay node being connected to the first base station and/or to the second base station. The computer program, when being executed by a data processor, is adapted for controlling the above described data load redistribution method.

As used herein, reference to a computer program is intended to be equivalent to a reference to a program element and/or a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

The described data load redistribution within a relay enhanced telecommunication network introduces a solution which copes with the problem of future mobile radio systems like Long Term Evolution (LTE) networks and Advanced Long Term Evolution (LTE-A) networks and the fact that the high operating frequency bands will limit achievable ranges.

However it has to be mentioned that the use of the described principle in existing technologies other than LTE or LTE-A is not precluded, but the parameters and procedures have to be adapted to existing technology, interfaces and architecture.

Relay nodes typically use a self back haul concept, i.e. a part of the spectrum is re-used for backhaul between the relay node and the base station (or enhance NodeB), where the other part is used for the traffic between multiple user equipments and the base station. Relay nodes offer a new level of load balancing solutions in mobile telecommunication networks, which solutions have not been exploited yet. However, when utilizing the data load redistribution procedure described in this application at least some load balancing capability of a relay node can be exploited.

The described data load redistribution procedure is applicable both for Frequency Division Duplex (FDD) and for Time Division Duplex (TDD) technologies. Further, the described invention could be applied also to all kind of mobile telecommunication networks other than LTE. This implies relay nodes, base stations and sectors which may be configured for instance by so called Self Optimizing Network (SON) procedures.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1A:
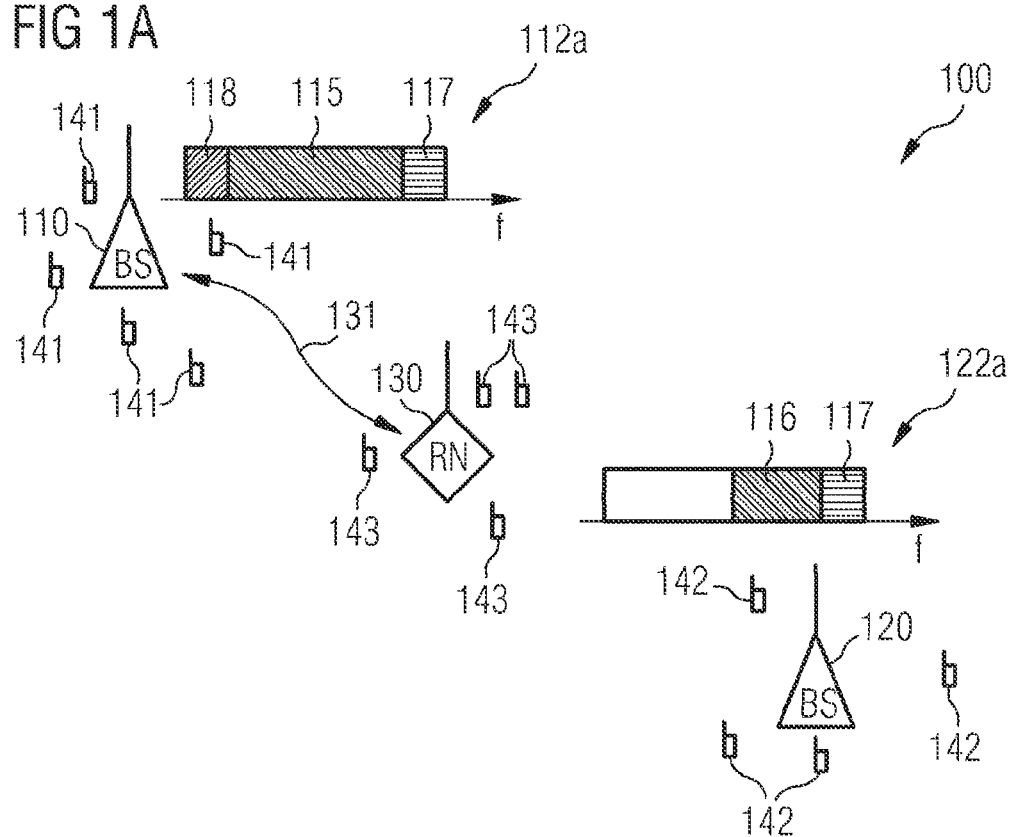
FIG. 1a shows a relay enhanced telecommunication network in a first operational state, wherein a relay node has a relationship with a first base station.

The illustration in the drawing is schematically. It is noted that in different figures, similar or identical elements are provided with the same reference signs or with reference signs, which are different from the corresponding reference signs only within the first digit. In the first operational state FIG. 1a shows a relay enhanced telecommunication network 100 in a first operational state. The telecommunication network 100 comprises a first base station 110, which spans a first cell of the telecommunication network 100, a second base station 120, which spans a second cell of the telecommunication network 100 and a relay node 130. The telecommunication network 100 further comprises a plurality of user equipments 141, 142 and 143. The user equipments 141 are served directly by the first base station 110. The user equipments 142 are served directly by the second base station 120. The user equipments 143 are connected to the relay node 130.

In the first operational state of the telecommunication network 100, which operational state is depicted in FIG. 1a, the relay node 130 has a relationship with the first base station 110. This is indicated by the curly double arrow 131. This means that the user equipments 143 are served indirectly by the first base station 110 via the relay node 130. Therefore, the first cell being assigned to the first base station 110 has to provide sufficient radio resource for the backhaul data traffic of the relay node 130.

Reference numeral 112a illustrates the radio resource spectrum allocation within the first cell. It should be noted that the spectrum 112a is being reused with a reuse factor of one.

A spectrum 115 is used for the data traffic between the user equipments 141 and the first base station 110.

A spectrum 117 is used for the data traffic between user equipments 143 and the relay node 130.

A spectrum 118 is used for the backhaul traffic of the relay node 130, i.e. the data traffic between the relay node 130 and the first base station 110.

As can be seen from FIG. 1a, in the first operational state the available radio resource is completely used by the three spectra 115, 117 and 118. There is no bandwidth available for further radio communication. This means that the first cell respectively the first base station suffers from an overload situation or at least from a maximal load situation.

Reference numeral 122a illustrates the radio resource spectrum allocation within the second cell.

A spectrum 116 is used for the data traffic between the user equipments 142 and the second base station 120.

The spectrum 117, which is used for the data traffic between the user equipments 143 and the relay node 130, also appears in the radio resource spectrum 122a.

A significant bandwidth of the spectrum 122a, which bandwidth is indicated in FIG. 1a with a white block, is not used.

By contrast to the available radio resource of the first cell (see spectrum 112a, which is entirely consumed), the spectrum 122a being associated with the second cell respectively with the second base station 120 is only partly used.

Figure 1B:
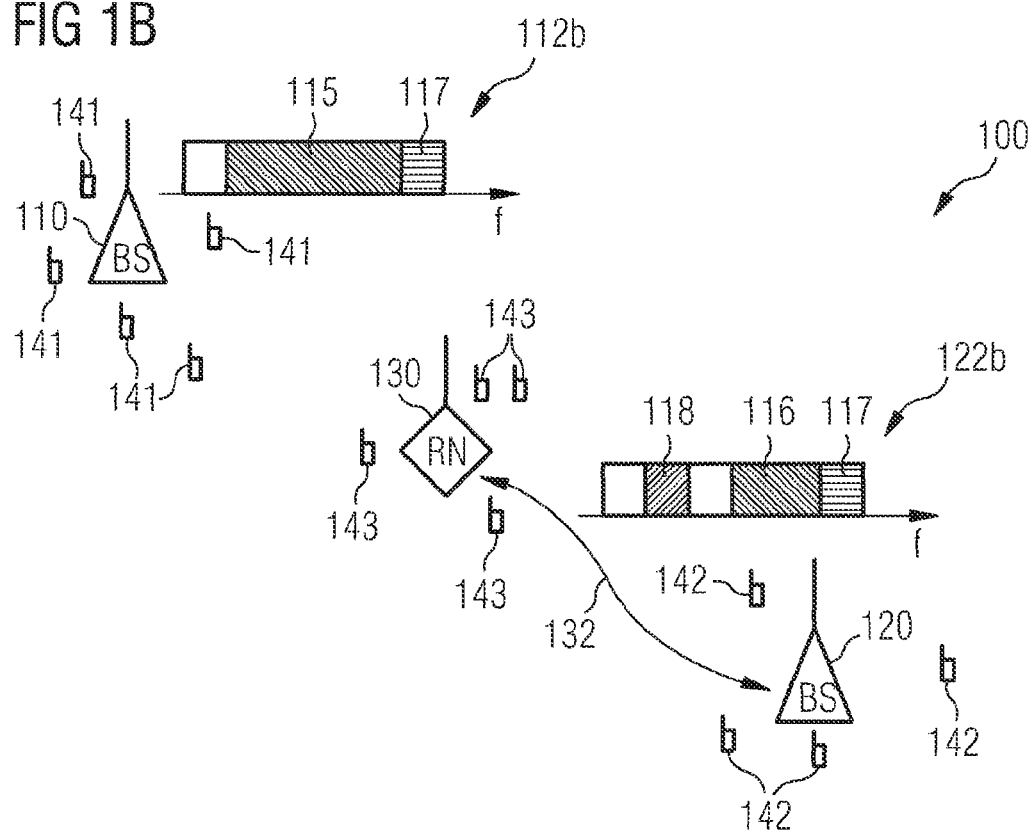
FIG. 1b shows the relay enhanced telecommunication network in a second operational state, wherein the relay node has a relationship with a second base station.

FIG. 1b shows the relay enhanced telecommunication network 100 in a second operational state, wherein the relay node 130 has stopped its relationship 131 with the first base station 110 and wherein the relay node has established a relationship 132 with the second base station 120. This can be interpreted as a handover of the relay node 130 together with the attached user equipments 143 from the first base station 110 to the second base station 120. This can be achieved by carrying out any embodiment of the data load redistribution method described above.

As can be seen from the spectrum 112b, which shows the first cell spectrum allocation in the second operational state, and from the spectrum 122b, which shows the second cell spectrum allocation in the second operational state, the spectrum 117, which is allocated for the data traffic between the relay node 130 and the attached user equipments 143, remains the same. However, spectrum 118, which is related to the backhaul data traffic of the relay node, is now allocated to the second cell respectively the second base station 120. In other words, when switching from the first operational state to the second operational state the backhaul data traffic 118 of the relay node 130 is offloaded from the first base station 110 respectively the first cell and loaded on the second base station 120 respectively the second cell.

As can be seen from FIG. 1b, even after shifting the backhaul traffic 118 from the first cell to the second cell, there are still some radio resources available within the second cell spectrum allocation 122b. These available portions, which are depicted as two white boxes, wherein one box is depicted on the left side of the spectrum 118 and the other box is depicted on the right side of the spectrum 118, can be used for instance by a more robust modulation and coding scheme for the data traffic being associated with the spectrum 116, the spectrum 117 and/or the spectrum 118. If a more robust modulation and coding scheme would be used, these available portions of the spectrum 122b could be used at least partially.

It should be noted that the term "comprising" does not exclude other elements or steps and "a" or "an" does not exclude a plurality. It should also be noted that reference signs in the claims should not be construed as limiting the scope of the claims.

LIST OF REFERENCE SIGNS 100 telecommunication network
110 first base station (BS)
112a first cell spectrum allocation (first operational state)
112b first cell spectrum allocation (second operational state)
115 spectrum used for data traffic between user equipments 141 and first base station 110
116 spectrum used for data traffic between user equipments 142 and second base station 120
117 spectrum used for data traffic between user equipments 143 and relay node 130
118 spectrum used for relay node backhaul traffic
120 second base station (BS)
122a second cell spectrum allocation (first operational state)
122b second cell spectrum allocation (second operational state)
130 relay node (RN)
131 relationship relay node—first base station
132 relationship relay node—second base station
141 user equipment (UE)
142 user equipment (UE)
143 user equipment (UE)

The invention claimed is:

1. A method for changing the data load distribution within a mobile wireless telecommunication network comprising a first base station, a second base station and a relay node being connected to the first base station and/or to the second base station, the method comprising:
    establishing for each of a plurality of user equipments a first indirect connection to the first base station via the relay node,
    establishing in a collective manner for each of the plurality of user equipments a second indirect connection to the second base station via the relay node,
    monitoring by the relay node of a plurality of base stations neighboring the relay node,
    determining a ranking of the monitored plurality of base stations, wherein the ranking is indicative of the suitability of each respective base station of the monitored plurality of base stations to act as the second base station,
    selecting a highest ranking base station of the monitored plurality of base stations as the second base station, and
    terminating in a collective manner for each of the plurality of user equipments the first indirect connection, wherein prior to terminating the first indirect connection, the relay node establishes a backhaul connection for data traffic to each of the first base station and the second base station.

2. The method as set forth in claim 1, further comprising:
    detecting an overload situation of the first base station before collectively terminating the plurality of first indirect connections.

3. The method as set forth in claim 1, further comprising:
    detecting an underload situation of the second base station before collectively establishing the plurality of second indirect connections.

4. The method as set forth in claim 1, wherein the relay node has a relationship to both the first base station and the second base station.

5. The method as set forth in claim 4, wherein collectively establishing the plurality of second indirect connections comprises:

setting up a new data connection between the relay node and the second base station, and/or collectively terminating the plurality of first indirect connections comprises:

closing an existing data connection between the relay node and the first base station.

6. The method as set forth in claim 5, wherein for the plurality of established second indirect connections an adaptive modulation and coding scheme is used.

7. A network element comprising at least one processor and at least one memory including a computer program code, wherein the at least one memory and the computer program code are configured, with the at least one processor, to cause the network element to perform:

changing the data load distribution within a mobile wireless telecommunication network comprising a first base station, a second base station and a relay node being connected to the first base station and/or to the second base station, wherein for each of a plurality of user equipments a first indirect connection to the first base station via the relay node is established, establishing in a collective manner for each of the plurality of user equipments a second indirect connection to the second base station via the relay node, monitoring by the relay node of a plurality of base stations neighboring the relay node, determining a ranking of the monitored plurality of base stations, wherein the ranking is indicative of the suitability of each respective base station of the monitored plurality of base stations to act as the second base station, selecting a highest ranking base station of the monitored plurality of base stations as the second base station, and terminating in a collective manner for each of the plurality of user equipments the first indirect connection, wherein prior to terminating the first indirect connection, the relay node establishes a backhaul connection for data traffic to each of the first base station and the second base station.

8. The network element as set forth in claim 7, wherein the network element is the first base station and/or the second base station.

9. The network element as set forth in claim 7, wherein the network element is the relay node.

10. The network element as set forth in claim 7, wherein the network element comprises a beam forming capability.

11. An apparatus comprising one or more processors and one or more tangible memories including computer program code, the one or more tangible memories and the computer program code being configured, with the one or more processors to cause the apparatus to perform a changing of the data load distribution within a mobile wireless telecommunication network comprising a first base station, a second base station and a relay node being connected to the first base station and/or to the second base station by:

establishing for each of a plurality of user equipments a first indirect connection to the first base station via the relay node, establishing in a collective manner for each of the plurality of user equipments a second indirect connection to the second base station via the relay node, monitoring the relay node of a plurality of base stations neighboring the relay node, determining a ranking of the monitored plurality of base stations, wherein the ranking is indicative of the suitability of each respective base station of the monitored plurality of base stations to act as the second base station, selecting a highest ranking base station of the monitored plurality of base stations as the second base station, and terminating in a collective manner for each of the plurality of user equipments the first indirect connection, wherein prior to terminating the first indirect connection, the relay node establishes a backhaul connection for data traffic to each of the first base station and the second base station.

* * * * *